(12) United States Patent
Yoshida

(10) Patent No.: US 8,830,276 B2
(45) Date of Patent: Sep. 9, 2014

(54) IMAGING APPARATUS

(75) Inventor: Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 12/895,247

(22) Filed: Sep. 30, 2010

(65) Prior Publication Data

US 2011/0080436 A1 Apr. 7, 2011

(30) Foreign Application Priority Data

Oct. 5, 2009 (JP) ................................. 2009-231852

(51) Int. Cl.
*G09G 5/10* (2006.01)
*G06F 3/14* (2006.01)
*G09G 5/00* (2006.01)

(52) U.S. Cl.
CPC ...... *G06F 3/1423* (2013.01); *G09G 2320/0626* (2013.01); *G09G 5/10* (2013.01); *G09G 2320/08* (2013.01); *G09G 5/003* (2013.01)
USPC .......................................... 345/690; 345/1.1

(58) Field of Classification Search
USPC ............ 345/690, 1.1, 1.2, 204–215; 396/279, 396/287, 296; 349/61, 73, 74, 114
See application file for complete search history.

(56) References Cited

U.S. PATENT DOCUMENTS

| 5,572,283 A * | 11/1996 | Wakabayashi et al. ....... 396/279 |
| 6,342,927 B1 * | 1/2002 | Kimoto et al. ................ 348/569 |
| 7,920,229 B2 * | 4/2011 | Onishi et al. ..................... 349/74 |
| 2003/0103174 A1 * | 6/2003 | Han et al. ......................... 349/61 |
| 2004/0056979 A1 * | 3/2004 | Kim .................................. 348/552 |
| 2007/0139297 A1 * | 6/2007 | Kudo et al. ..................... 345/1.1 |
| 2008/0309811 A1 * | 12/2008 | Fujinawa et al. ......... 348/333.01 |
| 2010/0190529 A1 * | 7/2010 | Morobishi ..................... 455/566 |

FOREIGN PATENT DOCUMENTS

JP 2002-116736 A 4/2002

* cited by examiner

*Primary Examiner* — Abbas Abdulselam
*Assistant Examiner* — Gerald Oliver
(74) *Attorney, Agent, or Firm* — Carter, DeLuca, Farrell & Schmidt, LLP

(57) ABSTRACT

An imaging apparatus includes a first display unit of which brightness is adjustable, a second display unit which can illuminate a display surface, an operation member configured to be operated by a user, and a control unit configured to display a screen for adjusting brightness of the first display unit on the first display unit and to turn on or turn off an illumination of the second display unit by operating the operation member when both of the first display unit and the second display unit are in a display state.

3 Claims, 4 Drawing Sheets

IMAGING APPARATUS

BACKGROUND OF THE INVENTION

1. Field of the Invention

The present invention relates to an imaging apparatus. More specifically, the present invention relates to a technique suitably used in an imaging apparatus including two display units.

2. Description of the Related Art

Japanese Patent Application Laid-open No. 2002-116736 discusses a technique for switching a display mode (i.e., for switching to a screen mode of improved luminance or corrected color in comparison to a normal screen), for example, by depressing an operation button while a moving image of a Digital Versatile Disk (DVD) or a television (TV) is displayed. Further, an imaging apparatus including two display units is also known to public.

However, according to an image switching method of a liquid crystal display apparatus discussed in the above mentioned Japanese Patent Application Laid-open No. 2002-116736, when the imaging apparatus includes two display units, the display units needs to be controlled respectively by two operation buttons. More specifically, the number of operation buttons is to correspond to the number of display units. In a recent trend toward downsizing imaging apparatuses and growing display unit size, there comes an issue that no space can be secured for disposing the operation buttons. To resolve the above issue, the conventional imaging apparatus realizes many operations with less operation buttons by providing hierarchically structured operation items. However, the hierarchical structure of the operation items invites cumbersome-operation and inhibits an intuitive operation.

SUMMARY OF THE INVENTION

According to an aspect of the present invention, an imaging apparatus includes a first display unit of which brightness is adjustable, a second display unit which can illuminate a display surface, an operation unit configured to be operated by a user, and a control unit configured to display a screen for adjusting brightness of the first display unit on the first display unit and to turn on or turn off an illumination of the second display unit by operating the operation member when both of the first display unit and the second display unit are in a display state.

The present invention is directed to an imaging apparatus that realizes an intuitive operation with respect to two display units by operating a single operation member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
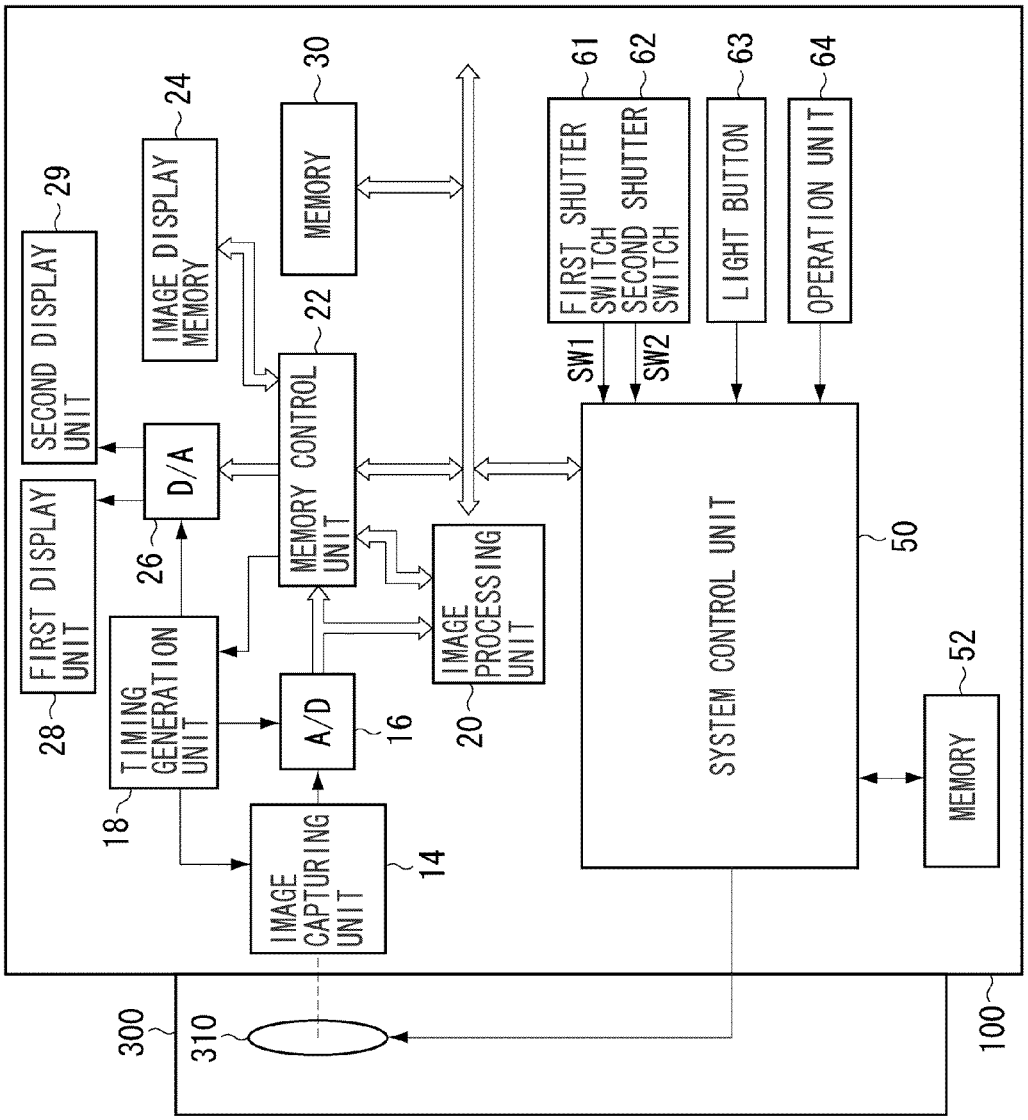
FIG. 1 is a block diagram illustrating an example of a configuration of a first exemplary embodiment of the present invention.

FIG. 1 is a block diagram illustrating a configuration of an imaging apparatus according to a first exemplary embodiment of the present invention. In FIG. 1, an imaging apparatus 100 includes an image capturing unit 14 configured to convert an optical image to an electrical signal.

A light beam entering into a lens 310 disposed in a lens unit 300 forms an image on the image capturing unit 14 in the form of an optical image. The optical image is subsequently converted into the electrical signal to be output from the image capturing unit 14. The electrical signal output from the image capturing unit 14 is supplied to an analog-to-digital (A/D) convertor 16. The A/D convertor 16 converts an analogue signal output from the image capturing unit 14 into a digital signal.

A timing generation unit 18 supplies a clock signal or a control signal to the image capturing unit 14, the A/D convertor 16, and a digital-to-analogue (D/A) convertor 26. The timing generation unit 18 is controlled by a memory control unit 22 and a system control unit 50.

An image processing unit 20 performs predetermined pixel interpolating processing or predetermined color conversion processing with respect to data from the A/D convertor 16 or data from the memory control unit 22. The image processing unit 20 also performs predetermined arithmetic processing by using the captured image data, as required. The system control unit 50 performs predetermined arithmetic processing by using the captured image data based on the acquired calculation result of the arithmetic processing performed by the image processing unit 20.

The memory control unit 22 controls the A/D convertor 16, the timing generation unit 18, the image processing unit 20, an image display memory 24, and the D/A convertor 26. Data output from the A/D convertor 16 is written into the image display memory 24 via the image processing unit 20 and the memory control unit 22. Alternatively, data output from the A/D convertor 16 is written into the image display memory 24 via the memory control unit 22.

A first display unit 28 is a thin-film transistor (TFT) liquid crystal display unit and a second display unit 29 is a liquid crystal display unit having fixed segments, e.g., a seven-segment liquid crystal display unit. The image data, which was written into the image display memory 24 in order to be displayed, is displayed by the first display unit 28 via the D/A convertor 26. In many cases, if the captured image data is successively displayed by using the first display unit 28 which is disposed on a rear surface of the imaging apparatus 100 in order to display an image, functions of an electronic finder and a live view can be realized. Further, the first display unit 28 displays a setting screen of the imaging apparatus 100 and a setting value or a setting condition of the imaging apparatus 100 according to an operation of an operation unit 64.

A second display unit 29 is disposed on a top surface of the imaging apparatus 100 in most cases and displays the setting value and the setting condition of the imaging apparatus 100 by a display/non-display of the fixed segments. Further, the second display unit 29 includes an illumination for lighting a display surface of the second display unit 29. The second display unit 29 can turn on or turn off the illumination according to an operation of a light button 63 as an operation member. The system control unit 50 controls the entire imaging apparatus 100. A memory 52 stores constants, variables, and programs to be used in operation by the system control unit 50.

A first shutter switch 61 is a shutter switch (SW1) which is turned on during a first stroke operation of a shutter button (not shown). The first shutter switch 61 gives an instruction to start operations such as automatic focus (AF) processing, automatic exposure (AE) processing, automatic white balance (AWB) processing, or flash exposure (FE) processing.

A second shutter switch 62 is a shutter switch (SW2) which is turned on by a second stroke operation of the shutter button (not shown), i.e., by a completion of the operation.

The second shutter switch (SW2) 62 performs the exposure processing, in which a signal read out from the image capturing unit 14 is written into the memory 30 in the form of image data via the A/D convertor 16 and the memory control unit 22, and development processing by using the arithmetic processing performed by the image processing unit 20 and the memory control unit 22.

The light button 63 is operated by a user of the imaging apparatus 100 in order to issue an instruction for on/off of the illumination of the second display unit 29. The operation unit 64 includes various types of buttons, touch panels and the like. For example, the operation unit 64 includes a menu button, a set button, a menu jump+ (plus) button, a menu jump− (minus) button, a playback image jump+ (plus) button, and a playback image jump− (minus) button. A function of each of the above described plus buttons and minus buttons makes it easier to select a numerical value or a function by including a dial type rotary switch, a cross switch or an eight-way switch.

Figure 2:
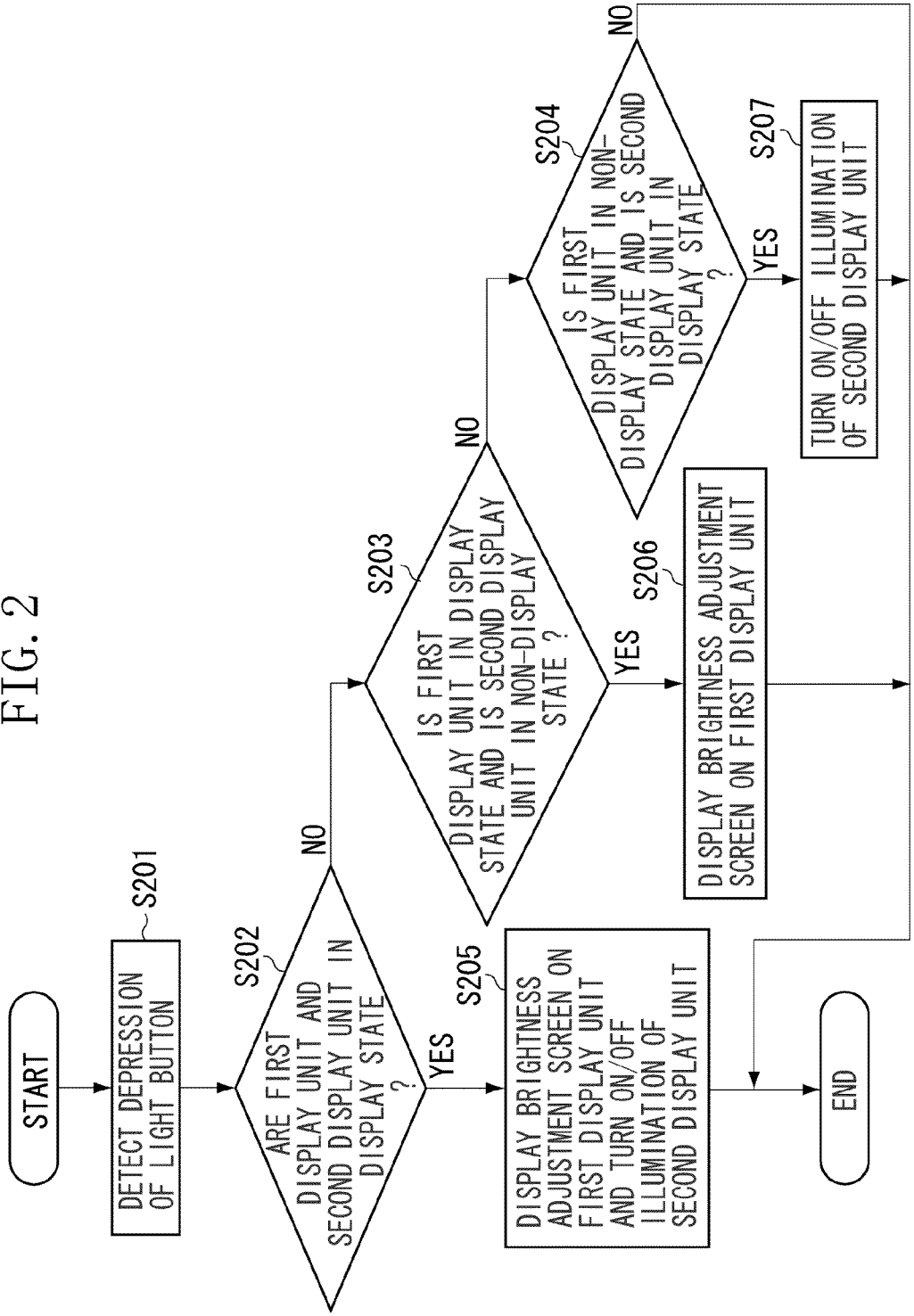
FIG. 2 is a flow chart illustrating operation steps of a main routine of the first exemplary embodiment.

Now, an example of processing steps for controlling the display unit performed according to states of the first display unit 28 and the second display unit 29 only with a single depression of the light button 63 is described with reference to a flow chart of FIG. 2. In this example, the single depression of the light button 63 enables a display of a brightness adjustment screen of the first display unit 28 on the first display unit 28 and further enables turning on/off of the illumination of the second display unit 29. The following display unit control processing is performed by the system control unit 50. That is, the system control unit 50 functions as a control unit.

In step S201, the system control unit 50 detects the depression of the light button 63 when the display unit control processing is started. Then, the processing proceeds to step S202.

In step S202, the system control unit 50 determines whether an image or information is displayed on the first display unit 28 and information is displayed on the second display unit 29. In the other words, the system control unit 50 determines whether both of the first display unit 28 and the second display unit 29 are in a display state. As a result of this determination, the processing proceeds to step S205 in a case of "YES" in step S202, whereas the processing proceeds to step S203 in a case of "NO" in step S202.

In step S203, the system control unit 50 determines whether an image or information is displayed on the first display unit 28 and information is not displayed on the second display unit 29. In other words, the system control unit 50 determines whether the first display unit 28 is in a display state and the second display unit 29 is in a non-display state. As a result of this determination, the processing proceeds to step S206 in a case of "YES" in step S203, whereas the processing proceeds to step S204 in a case of "NO" in step S203. In step S204, the system control unit 50 determines whether no image or information is displayed on the first display unit 28 and information is displayed on the second display unit 29. In other words, the system control unit 50 determines whether the first display unit 28 is in a non-display state and the second display unit 29 is in a display state. As a result of this determination, the processing proceeds to step S207 in a case of "YES" in step S204, whereas the processing proceeds to end processing in a case of "NO" in step S204.

Figure 4:
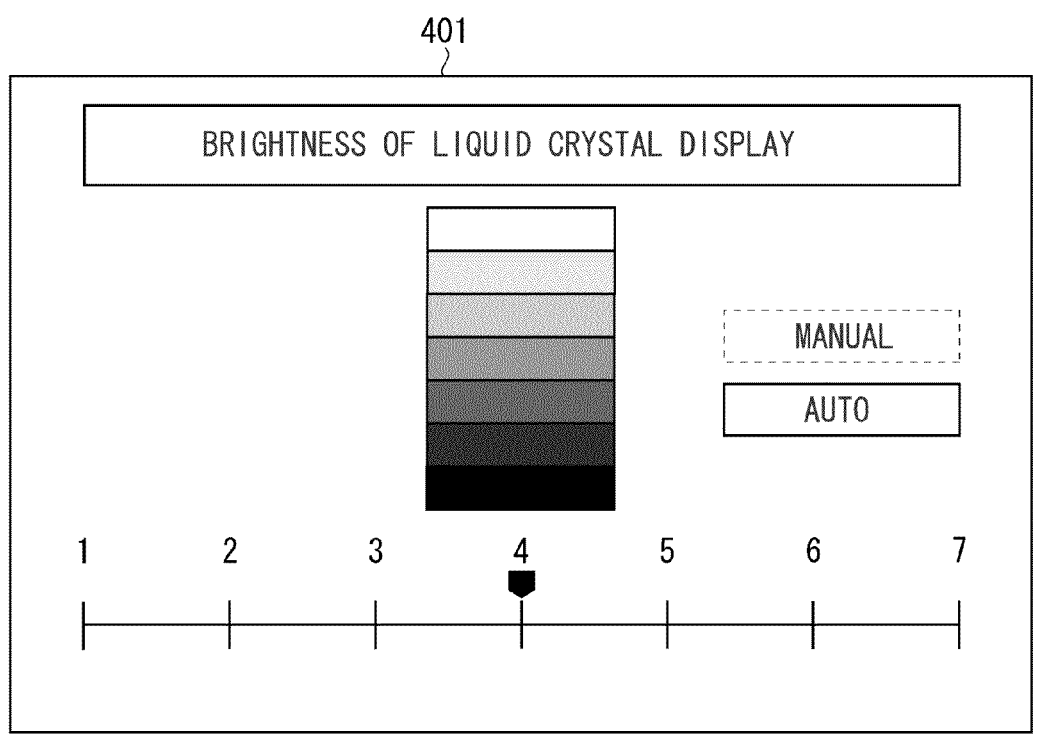
FIG. 4 illustrates a display example of a brightness adjustment screen of a first display unit.

In step S205, a brightness adjustment screen shown in FIG. 4 is displayed on the first display unit 28 and the system control unit 50 causes the illumination to be turned on in a case where the illumination of the second display unit 29 is off, whereas the system control unit 50 causes the illumination of the second display unit 29 to be turned off in a case where the illumination of the second display unit 29 is on. FIG. 4 illustrates a brightness adjustment screen 401 for adjusting brightness of the first display unit 28. An automatic brightness adjustment and a manual brightness adjustment can be switched to each other when the user operates the operation unit 64 while the brightness adjustment screen 401 is displayed. When the brightness adjustment is switched to the manual brightness adjustment, a level of the brightness of the first display unit 28 can be changed to any one of 7 levels, i.e., can be switched between levels 1 through 7. In the brightness adjustment screen 401, the levels of the brightness are displayed in the form of a gradation pattern as illustrated in FIG. 4, which provides an indication of the brightness adjustment.

In step S206, the system control unit 50 causes the first display unit 28 to display the brightness adjustment screen 401 of the first display unit 28. At the time, the second display unit 29 is still in a state that no information is displayed thereon and the system control unit 50 does not illuminate the second display unit 29.

In step S207, in a case where the illumination of the second display unit 29 is off, the system control unit 50 lights up the display unit, whereas, in a case where the illumination of the second display unit 29 is on, the system control unit 50 turns off the illumination. At the time, no image or information is displayed on the first display unit 28 yet, i.e., no brightness adjustment screen 401 is displayed on the first display unit 28 yet.

As described above, the user can realize the intuitive operation only with a single depression of the light button 63 according to the present states of the first display unit 28 and the second display unit 29 in comparison with a case where the user operates the operation unit 64 to display the brightness adjustment screen 401 of the first display unit 28. For example, in a case where an image or information is displayed on the first display unit 28 and information is displayed on the second display unit 29, the system control unit 50 can display the brightness adjustment screen 401 of the first display unit 28 on the first display unit 28 as well as can turn on or turn off the illumination of the second display unit 29.

In a case where information is displayed on the first display unit 28 and no image or information is displayed on the second display unit 29, the system control unit 50 can display the brightness adjustment screen 401 of the first display unit 28 on the first display unit 28. Further, in a case where no image or information is displayed on the first display unit 28 and information is displayed on the second display unit 29, the system control unit 50 can turn on/off the illumination of the second display unit 29.

Now, a second exemplary embodiment of the present invention is described below with reference to FIG. 3. In an imaging apparatus according to the present exemplary embodiment, only with a single depression of the light button 63, the system control unit 50 displays a brightness adjustment screen 401 of the first display unit 28 on the first display unit 28 according to a displayed content of the first display unit 28 and turns on/off the illumination of the second display unit 29.

Figure 3:
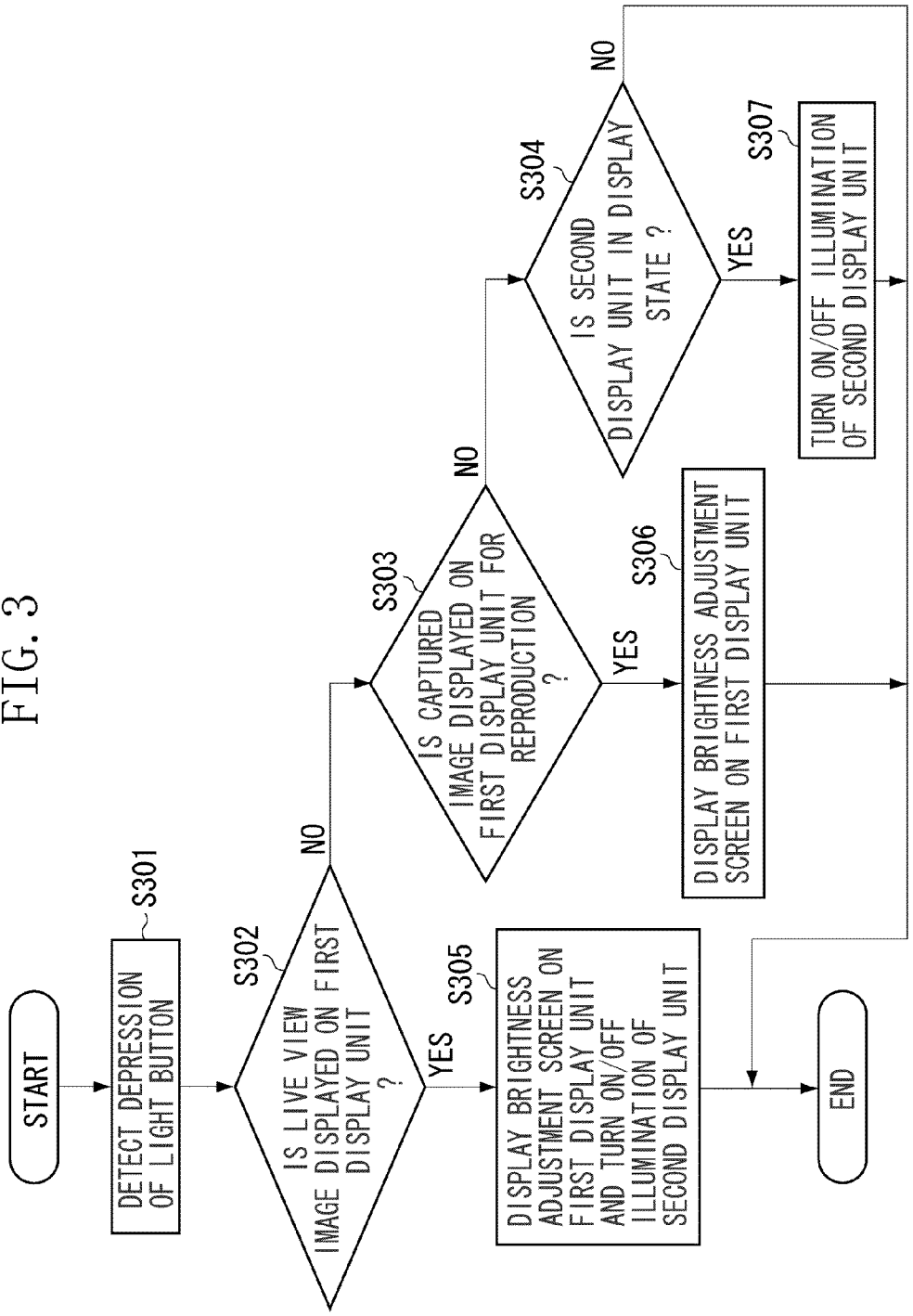
FIG. 3 is a flow chart illustrating operation steps of a main routine of a second exemplary embodiment.

FIG. 3 is a flow chart illustrating characteristics of the second exemplary embodiment.

In step S301, when the processing is started, the system control unit 50 detects depression of the light button 63. Then, the processing proceeds to step S302.

In step S302, the system control unit 50 determines whether a live view image is displayed on the first display unit 28. As a result of this determination, the processing proceeds to step S305 in a case of "YES" in step S302, whereas the processing proceeds to step S303 in a case of "NO" in step S302.

In step S303, the system control unit 50 determines whether the captured image is displayed on the first display unit 28 for reproduction. As a result of this determination, the processing proceeds to step S306 in a case of "YES" in step S303, whereas the processing proceeds to step S304 in a case of "NO" in step S303.

In step S304, the system control unit 50 determines whether information is displayed on the second display unit 29. As a result of this determination, the processing proceeds to step S307 in a case of "YES" in step S304, whereas the processing proceeds to end processing in a case of "NO" in step S304.

In step S305, the system control unit 50 displays the brightness adjustment screen 401, illustrated in FIG. 4, of the first display unit 28 on the first display unit 28 and turns on the lighting device of the second display unit 29 in a case where the illumination of the second display unit 29 is off, whereas the system control unit 50 turns off the lighting device of the second display unit 29 in a case where the lighting device of the second display unit 29 is on.

In step S306, the system control unit 50 displays the brightness adjustment screen 401 of the first display unit 28 on the first display unit 28. At the time, no information is displayed yet on the second display unit 29 and the system control unit 50 does not turn on the illumination of the second display unit 29.

In step S307, the system control unit 50 turns on the illumination of the second display unit 29 in a case where the lighting device of the second display unit 29 is off, whereas the system control unit 50 turns off the illumination of the second display unit 29 in a case where the lighting device of the second display unit 29 is on.

As described above, only with the single depression of the light button 63 by the user, the system control unit 50 can display the brightness adjustment screen 401 on the first display unit 28 as well as can turn on/off the lightning device of the second display unit 29 according to whether a displayed content of the first display unit 28 is a live view image or a playback image. Accordingly, more intuitive operation can be realized in comparison with a case where the user operates the operation unit 64 to display the brightness adjustment screen 401 of the first display unit 28.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-231852 filed Oct. 5, 2009, which is hereby incorporated by reference herein in its entirety.

What is claimed is:

1. An imaging apparatus comprising:
a first display unit of which brightness is adjustable;
a second display unit which has an illumination;
an operation member configured to be operated; and
a control unit configured to display an adjusting screen for adjusting brightness on the first display unit and to turn on or turn off the illumination of the second display unit,
wherein if the operation member is operated in a case where the first display unit and the second display unit are in a display state, the control unit displays the adjusting screen on the first display unit and turns on or turns off the illumination of the second display unit,
wherein if the operation member is operated in a case where the first display unit is in the display state and the second display unit is in a non-display state, the control unit displays the adjusting screen without turning on or turning off the illumination of the second display unit, and
wherein if the operation member is operated in a case where the first display unit is in a non-display state and the second display unit is in a display state, the control unit turns on or turns off the illumination of the second display unit without displaying the adjusting screen on the first display unit.

2. An imaging apparatus comprising:
a first display unit of which brightness is adjustable;
a second display unit which has an illumination;
an operation member configured to be operated; and
a control unit configured to display an adjusting screen on the first display unit and to turn on or turn off the illumination of the second display unit,
wherein if the operation member is operated in a case where the first display unit displays a live view image, the control unit displays the adjusting screen on the first display unit and turns on or turns off the illumination of the second display unit, and
wherein if the operation member is operated in a case where the first display unit displays a captured image for reproduction, the control unit displays the adjusting screen without turning on or turning off the illumination of the second display unit.

3. The imaging apparatus according to claim 2, wherein if the operation member is operated in a case where the first display unit does not display the live view image or the captured image for reproduction, the control unit turns on or turns off the illumination of the second display unit without displaying the adjusting screen on the first display unit.

* * * * *